(12) United States Patent  
Belady

(10) Patent No.: US 7,945,743 B2  
(45) Date of Patent: May 17, 2011

(54) DYNAMIC STORAGE BASED ON PERFORMANCE THROTTLING

(75) Inventor: Christian L. Belady, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 11/742,094

(22) Filed: Apr. 30, 2007

(65) Prior Publication Data

US 2008/0270691 A1    Oct. 30, 2008

(51) Int. Cl.  
*G06F 12/00* (2006.01)

(52) U.S. Cl. ........ 711/154; 711/100; 711/114; 713/300; 702/132; 702/130; 702/136; 62/259.2

(58) Field of Classification Search .................. 711/114; 720/649; 702/132, 131  
See application file for complete search history.

(56) References Cited

U.S. PATENT DOCUMENTS

| | | | |
|---|---|---|---|
| 2004/0054938 A1* | 3/2004 | Belady et al. ................. | 713/300 |
| 2004/0264124 A1* | 12/2004 | Patel et al. .................... | 361/686 |
| 2005/0138284 A1* | 6/2005 | Cohn et al. .................... | 711/114 |
| 2005/0264995 A1* | 12/2005 | Hanson .......................... | 361/695 |
| 2006/0010353 A1* | 1/2006 | Haugh ........................... | 714/47 |
| 2006/0047466 A1* | 3/2006 | White ............................ | 702/130 |

OTHER PUBLICATIONS

J. Moore, J. Chase, P. Ranganathan, and R. Sharma. "Making scheduling "cool": Temperature-aware workload placement in data centers", In USENIX Annual Technical Conference, pp. 61-75, Apr. 2005.*

Enrique V. Carrera , Eduardo Pinheiro , Ricardo Bianchini, "Conserving disk energy in network servers", Proceedings of the 17th annual international conference on Supercomputing, Jun. 23-26, 2003, San Francisco, CA, USA.*

S. Gurumurthi, The Need for Temperature-Aware Storage Systems. In Proceedings of the Intersociety Conference on Thermal and Thermomechanical Phenomena in Electronic Systems (ITHERM), pp. 387-394, May 2006.*

* cited by examiner

*Primary Examiner* — Brian R Peugh  
*Assistant Examiner* — Sam Chen

(57) ABSTRACT

A system and method for dynamic storage based on performance throttling. The method comprises providing an array of storage devices coupled to a computing device. The method comprises determining a status of a system condition, such as ambient temperature. The method comprises throttling the operating speed of one or more storage devices in the array based on the status of the system condition. The method comprises determining relative frequency of access to data to be stored by the computing device in the array of storage devices. The method comprises optimizing storage of data by the computing device in the array of storage devices based at least in part on 1) relative frequency of access to data and 2) which of the one or more storage devices are throttled.

20 Claims, 4 Drawing Sheets

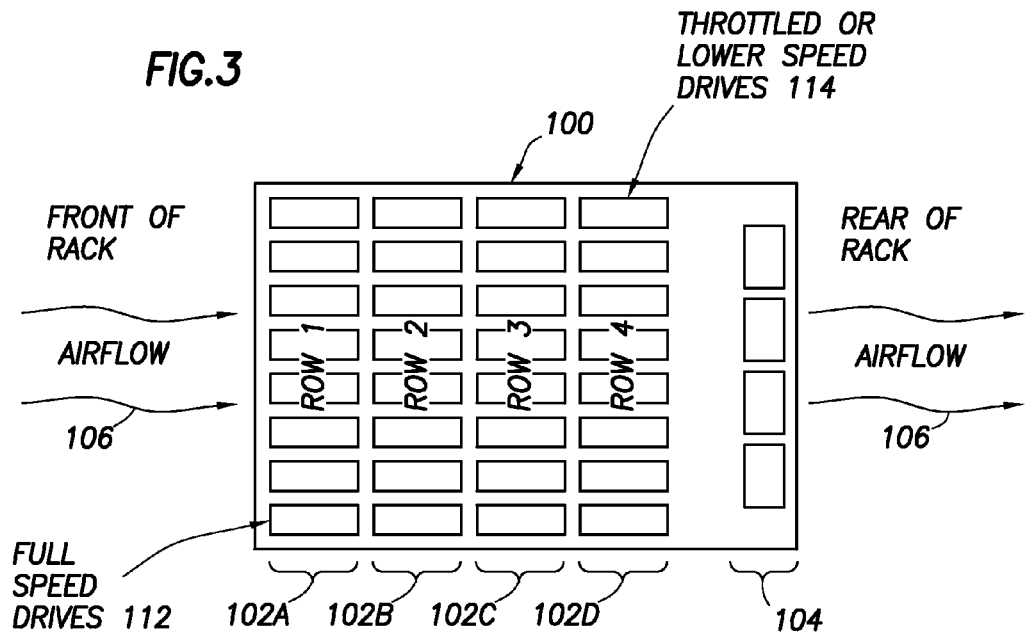
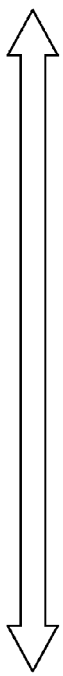
FIG.3
FIG.4

DYNAMIC STORAGE BASED ON PERFORMANCE THROTTLING

BACKGROUND

Storage arrays built from a group of drives in a rack have been designed to provide fresh air for the drives, thereby ensuring reliable operation and maximum performance for the drives. FIG. 1 illustrates such a storage array in a rack 100, having a plurality of drives 102 at the front of the rack, and a plurality of fans 104 at the rear of the rack. Airflow 106 cools the drives during use. Note, however, that in such an arrangement, a significant portion of the center of the rack is unused.

Additional designs for storage arrays have aimed to utilize more of the rack depth. As shown in FIG. 2, the rack 100 is filled with four rows of disk drives 102, and a row of fans 104 to cool the drives 102. As a result of such a rack layout, disks toward the rear of the rack reside in a higher temperature environment (i.e., the higher temperature drives 110) than the drives at the front of the rack (i.e., the lower temperature drives 108), because the drives towards the front of the rack 108 preheat the air. As such, higher airflow fans are needed to move the air. Additionally, the added rows of drives add airflow resistance, and thus the fans with higher static pressure abilities are needed. Despite the fans for cooling, the drives towards the rear of the rack will necessarily run hotter, and have higher failure rates.

BRIEF DESCRIPTION OF THE DRAWINGS

For a detailed description of exemplary embodiments of the invention, reference will now be made to the accompanying drawings in which:

FIG. 3 shows a top view block diagram of a storage array rack layout in accordance with the present disclosure;

FIG. 4 shows a block diagram of various system storage units in the order in which data is stored, based on priority or frequency of access in accordance with the present disclosure;

NOTATION AND NOMENCLATURE

Figure 1:
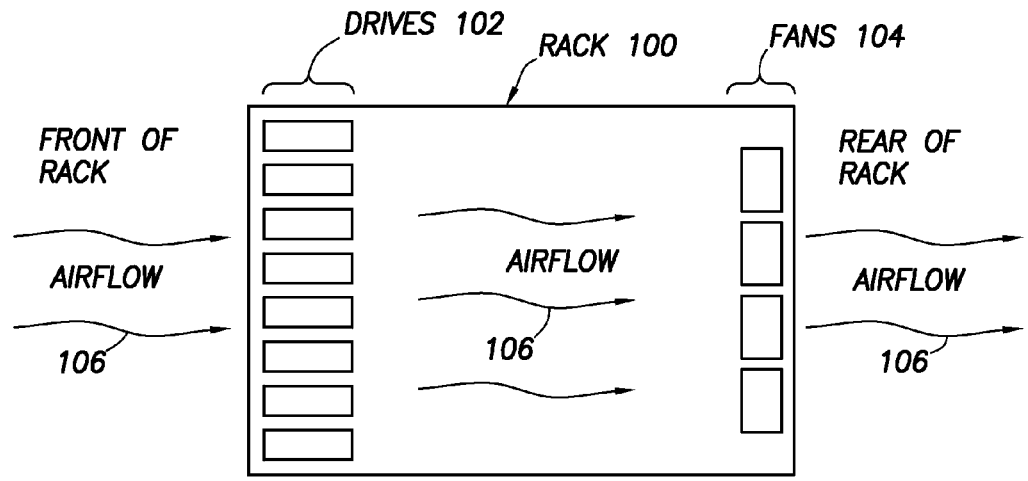
FIG. 1 shows a top view block diagram of a prior art storage array rack layout.
Figure 2:
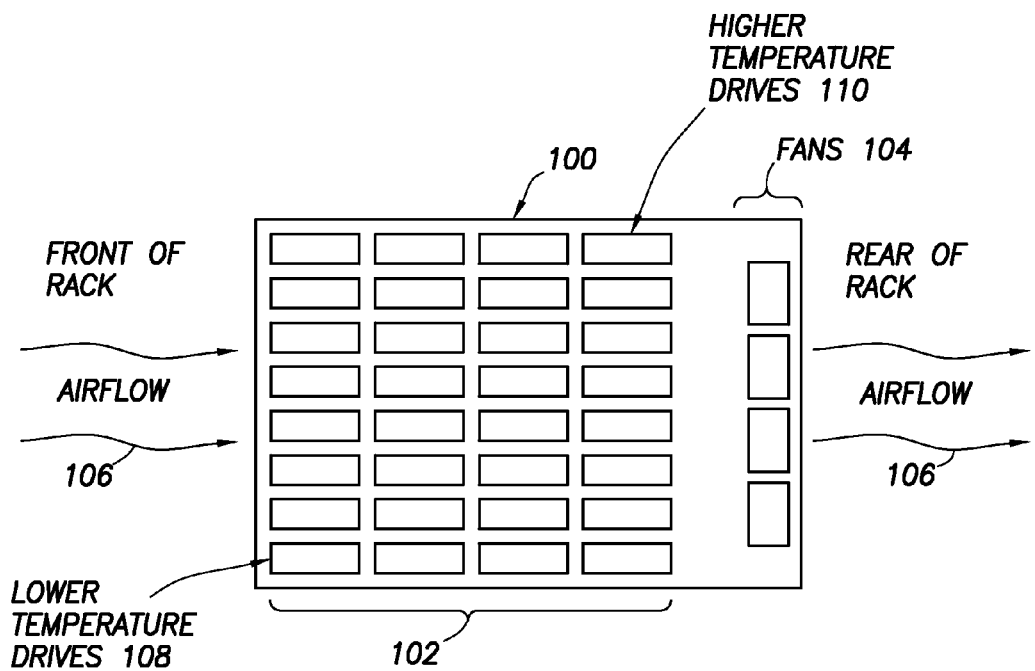
FIG. 2 illustrates a top view block diagram of another prior art storage array rack layout.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure is directed to methods and systems wherein disk drives (or other similarly functioning physical memory devices) are throttled, and data may be mapped to throttled disk drives according to the frequency access to the data. Specifically, for disk drives in a rack comprising a system storage array, the spindle speed of each disk drive may be throttled, or decreased, row by row across the depth of the rack, which may be a result of external environmental effects or exceeding certain thresholds, including temperature or power. Each throttled row of drives thus has slower access times than the previous row. Data that is accessed frequently is then stored in the drives that are not throttled, or drives that are throttled less than other drives, while data that is accessed relatively infrequently may be stored in the most, or more, throttled disk drives. Whether, or the degree to which a disk drive is throttled, may be predetermined and set statically by design, or alternatively, the disk drive may employ sensors so as to be self-aware of certain system conditions and environment, such as temperature, power, or reliability. In various embodiments, a rack or system wide processor may synchronize and monitor the various drives, and dynamically set storage priorities. A further advantage of the present disclosure is enabling the use of less powerful, less noisy fans to cool the devices in the rack.

As shown in FIG. 3, the devices in the rack may be organized according to their location relative to fresh air access, or the front of rear of the rack. As shown in FIG. 3, the drives are arranged in rows, specifically in four rows in the embodiment of FIG. 3, but a rack could contain as many rows as feasible based on physical limitations, temperature limitations, the power of fans, and the like. As shown, the drives 112 in row 1 (102A) are maintained as full speed drives, being physically closest to the front of the rack and with access to fresh air in the form of airflow 106. The drives 114 in row 4 (102D) may be throttled down to a lower speed, being physically closest to the rear of the rack and the fans 104. Devices in rows 2 and 3 (102B and C) respectively may be throttled to some degree greater than no throttling at all, as with row 1 (102A) and to some degree less than the greatest degree of throttling found in disk drives of row 4 (102D), or throttled to the same degree as row 4 (102D), depending on various system conditions and programming. In some embodiments, the back row 102D could be throttled while the other rows remain at full speed. Likewise, in some embodiments, the particular disk drives that are throttled could be in any geometric configuration (as viewed from above, as with the figures herein) or a single disk drive anywhere in the array. In some embodiments, the disk drive or drives that are throttled could be selected for throttling at random.

Alternatively, the selection of drives for throttling may be performed, and then less frequently accessed data may be mapped to the throttled drives. By selecting and throttling drives ahead of time, conditions that could be dangerous to system function (such as overheating or exceeding a power cap) may be avoided proactively.

In some embodiments, drives 102 are throttled based on a configuration of predetermined protocols, while in other embodiments, the drives 102 are each self-aware of system conditions, such as temperature. In racks of self-aware drives, in lightly loaded configurations, the drives may not be as likely to overheat, and thus can opt to operate at higher spindle speeds.

In well controlled environments (such as, for example, a well cooled computer room), there may be no need to throttle any, or as many, drives, and thus the decision of whether or not to throttle may be made dynamically (either by a drive individually, or the system overall monitoring the drives) in order to achieve increased performance and/or reliability. For example, drives may be throttled dynamically upon the occurrence of exceeding a predetermined threshold for, for example, power or temperature. Alternatively, settings for throttling may be set statically when there are known problem locations in rack, the environment of which often indicates that throttling is advisable to avoid overheating. Such static settings could be set at time of assembly.

FIG. 4 shows a block diagram of various system storage units in the order in which data is stored, based on priority or frequency of access. A computer system 118 operating in conjunction with the rack 100 stores data that is most frequently accessed in storage that is most quickly accessed, and data that is least often accessed in storage that is slower. Thus, as shown in FIG. 4, the preference for storing data is ordered according to the following: L1 Cache, L2 Cache, L3 Cache, L4 Cache, System memory, and the memory external to the computer system, namely Storage Array—Row 1, Storage Array—Row 2, Storage Array—Row 3, Storage Array—Row 4, and finally tape storage. As is known in the art, cache memory often has the fastest access time, thus data used most frequently is prioritized and stored therein. In accordance with the present disclosure, Storage Array—Row 1, operating at full speed and not being throttled to a lower speed, provides fastest access to data, at least with respect to the other rows in the same rack, and Storage Array—Row 2 offers slightly less fast access, Storage Array—Row 3 slightly less fast access than Row 2, and so on, although as discussed above, the various rows may be throttled to the same degree or differing degrees as needed.

Figure 5:
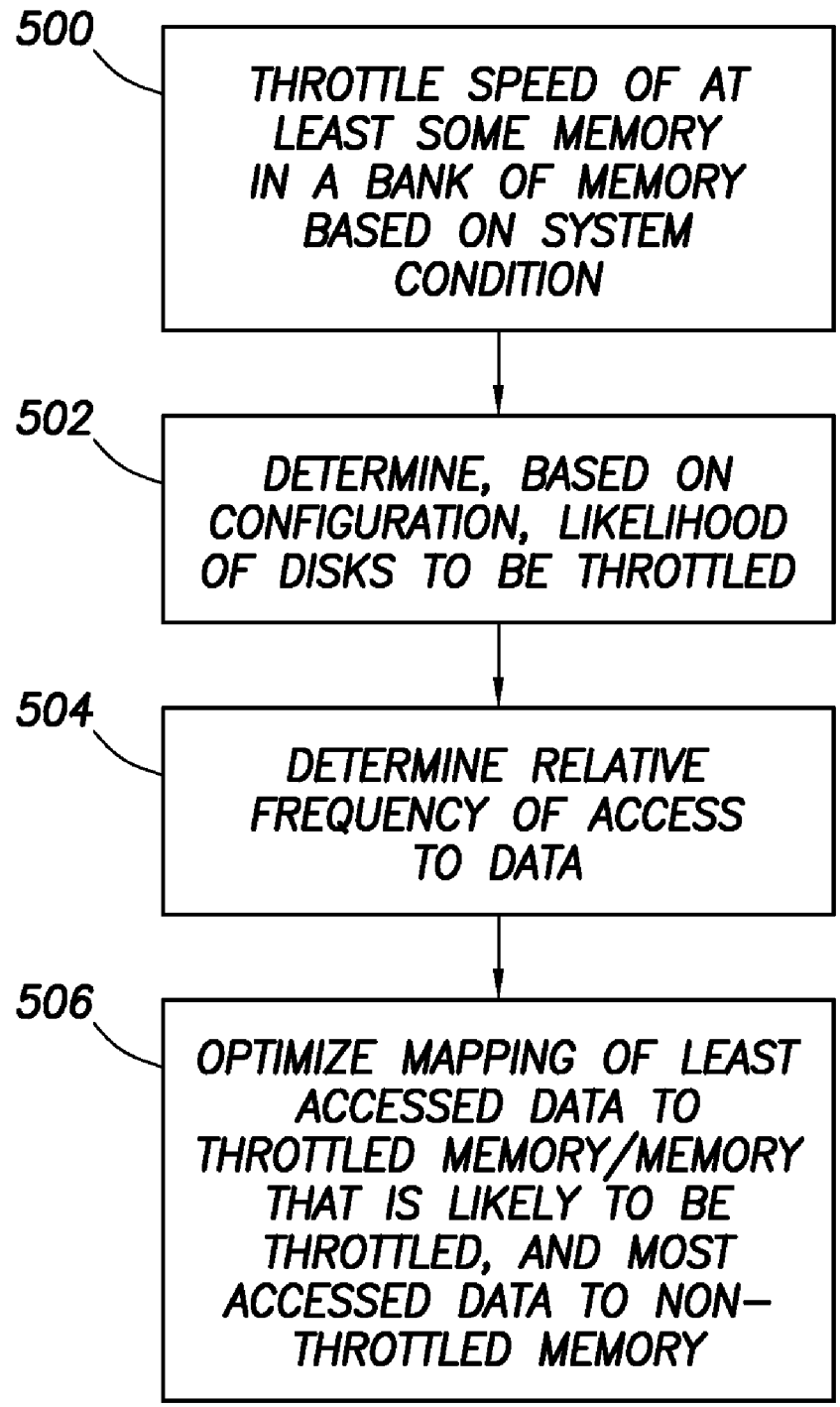
FIG. 5 illustrates a flowchart of a method for dynamic hierarchical storage based on performance throttling in accordance with the present disclosure.

Referring now to FIG. 5, a flowchart is shown of a method for dynamic hierarchical storage based on performance throttling. The method begins with throttling the speed of at least one or more disk drives in a bank of drives based on a system condition (block 500). A system condition may include, for example, ambient temperature, a power cap, or a failure rate of drives in the system. In some embodiments, the drive (or drives) that is throttled is physically located in a specific region of the configuration, such as in the warmest region of a physical arrangement such as a rack. In some embodiments, the drives are self-aware, and adjust the speed based on the system condition without direction from any system logic. For example, a disk drive may be programmed with a threshold temperature, and upon operating at a temperature above the threshold, the disk drive automatically adjusts its spindle speed to a lower speed in order to accommodate the ambient temperature and ensure continued operation and reliability. As another example, a disk drive may be programmed to operate within a power cap, and upon exceeding the power cap, the disk drive is programmed to automatically reduce its spindle speed in order to reduce its power consumption.

At block 502, system logic determines which of the disk drives in the rack may be likely, based on characteristics known about the configuration, to be throttled, even if not currently throttled. For example, a particular row of disk drives or a particular single disk may be currently operating at acceptable temperatures, but based on location near the rear of the rack, such drives are likely to be throttled upon exceeding a threshold temperature.

At block 504, system logic controls mapping of data to external storage such as a storage array comprising rows of disk drives and determines the relative frequency of access to data. Data that is accessed relatively less frequently may be logically mapped to less fast access storage, such as a throttled drive, or drive that is likely to be throttled based on its location, while data that is accessed relatively more frequently may be logically mapped to more fast access storage, such as a non-throttled, full speed disk drive. At block 506, the system logic that controls mapping of data to external storage optimized the mapping of least access data to a throttled disk drive or disk drive likely to be throttled, and most accessed data to full speed memory, as necessary. In some embodiments, throttled drives or drives likely to be throttled may be used for storing data as full speed drives become too full and, thus, unavailable.

Figure 6:
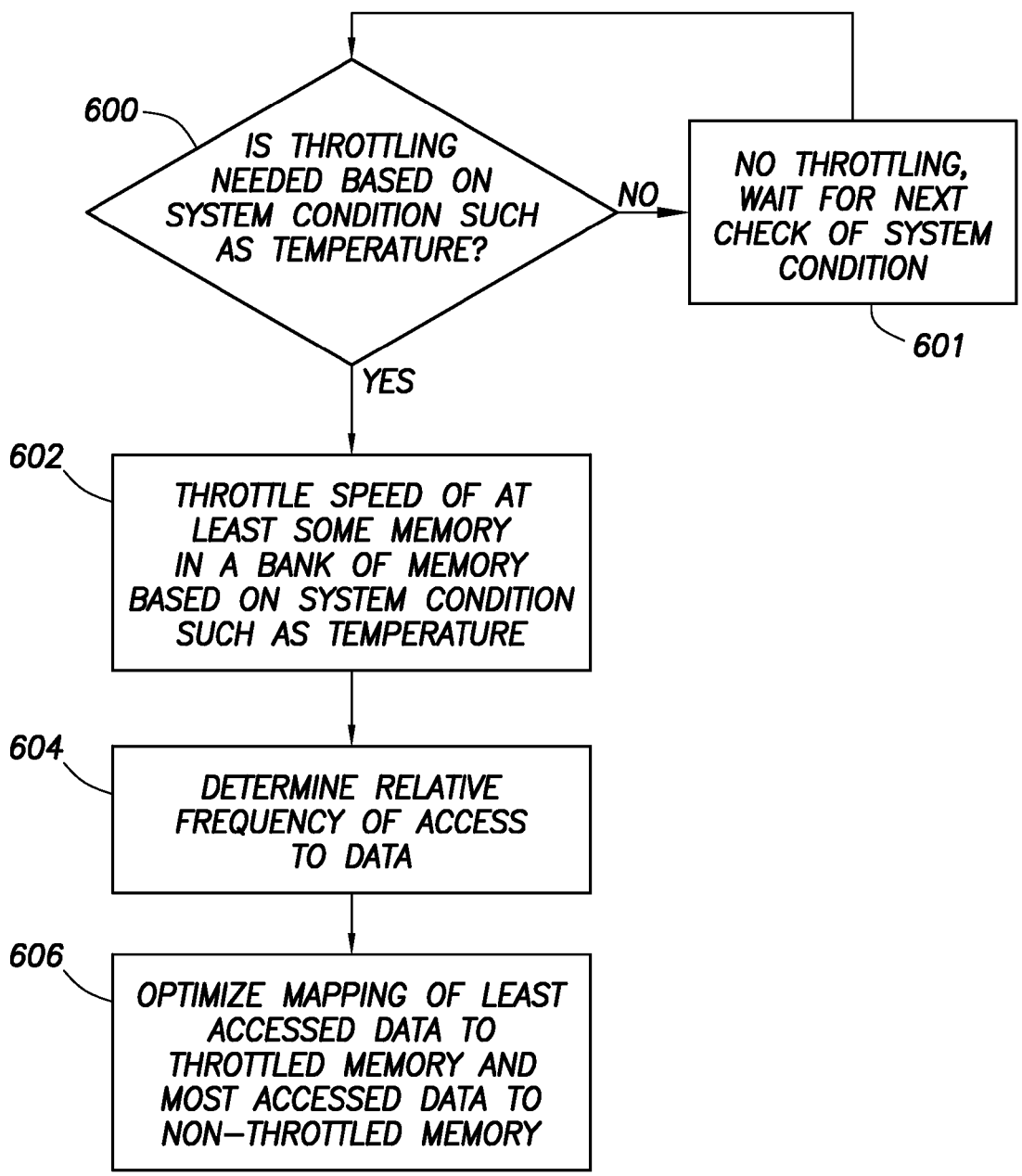
FIG. 6 illustrates a flowchart of another method for dynamic hierarchical storage based on performance throttling in accordance with the present disclosure.

FIG. 6 shows a flowchart of another method for dynamic hierarchical storage based on performance throttling. The method begins with a determination of whether throttling is needed, based on a system condition (block 600). In some embodiments, a system condition may include ambient temperature or a failure rate of memory drives in the system. The determination of whether throttling is even needed may be carried out by system logic or by each individual disk drive. In various embodiments, system conditions may be well controlled and ambient temperature may not indicate that any throttling is necessary, and in such situations, no disk drives are throttled (block 601). The determination at block 600 is repeated periodically to reassess the system condition.

If throttling is determined to be needed at block 600, then the method continues with throttling the speed of at least some drives in the bank of disk drives based on the system condition (block 602). The determination of which particular drive or drives in the bank of drives is throttled may be based on the physical location in a specific region of the configuration, such as in the warmest region of a physical arrangement such as a rack. By comparison to the discussion of self-aware drives above, in some embodiments, the system is self-aware and monitors the system conditions for each drive, and adjusts the speed of each drive individually based on the system condition with direction from the system logic. For example, the system logic may be programmed with a threshold temperature, and upon any disk drive within the system operating at a temperature above the threshold, the system adjusts the spindle speed of the particular drive (and as necessary, other drives in the vicinity, as logically, drives near an overheated drive are also susceptible to overheating) in the bank to a lower speed in order to accommodate the ambient temperature and ensure continued operation and reliability across the bank of drives.

The drives that are throttled may be some or all of the drives in the bank, though preferably, the drives are organized into rows, and the degree to which any particular drive is throttled is based on which row in the bank the drive resides in.

At block 604, system logic controls mapping of data to external storage such as a storage array comprising rows of disk drives and determines the relative frequency of access to data. Data that is accessed relatively less frequently may be logically mapped to less fast access storage, such as throttled drives, while data that is accessed relatively more frequently may be logically mapped to more fast access storage, such as non-throttled, full speed drives. At block 606, the system logic that controls mapping of data to external storage optimized the mapping of least access data to throttled drives and most accessed data to full speed drives, as necessary. In some embodiments, throttled drives are used for storing data as full speed drives become too full and thus unavailable.

In various embodiments, drives may be throttled to result in a constant temperature, power rating, or a preferred degree of reliability. In various embodiments, disk drives may be throttled based on configuration either by predetermined protocols or by self-awareness of system condition such as temperature or power consumption. In lightly loaded configurations, drives may not become as hot, and thus, may be permitted to operate at higher spindle speeds.

In various embodiments, in well controlled and/or lower temperature environments, drives may be operated at full speed for increased performance, as throttling is determined to be unnecessary.

The degree of throttling (e.g., spindle speed) may be set one time statically, periodically, or dynamically in real time. For embodiments wherein throttling is applied dynamically, the system monitors disk temperatures throughout the bank of disk drives and applies throttling according to predetermined algorithms and geometries configured to permit the most reliable performance.

In various embodiments, the disk drives may have a set of predetermined speeds, just as processors have a predetermined set of p-states, and "throttling" refers to switching from a first predetermined speed to a second predetermined speed that is slower than the first predetermined speed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a computing device coupled to an array of storage devices, the computing device operable to store data in the array of storage devices;
   a system condition monitoring module that determines a status of a system condition; and
   a system logic that, based on the status of the system condition compared with a predetermined threshold for the system condition, determines whether to throttle the operating speed of one or more storage devices in the array;
   wherein the system logic throttles the operating speed of one or more storage devices in the array by reducing the operating speed of the one or more storage devices in the array in inverse relation to distance from the storage devices to a reference location.

2. The system according to claim 1, wherein the system logic determines relative frequency of access to data to be stored by the computing device in the array of storage devices, and optimizes storage of data by the computing device in the array of storage devices based at least in part on 1) relative frequency of access to data and 2) which of the one or more storage devices are throttled.

3. The system according to claim 1, wherein the system condition comprises ambient temperature and the system condition monitoring module comprises one or more temperature sensors operable to determine temperature in one or more physical regions of the array of storage devices.

4. The system according to claim 1, wherein the system logic optimizes storage of data by the computing device by storing least accessed data in one of the storage devices having a throttled operating speed or likely to be throttled.

5. The system according to claim 1, wherein the system logic optimizes storage of data by the computing device by storing most accessed data in one of the storage devices not having a throttled operating speed or not likely to be throttled.

6. The system according to claim 1, wherein the system logic determines whether throttling is necessary based on the status of system condition, and maintains one or more storage devices in the array at full speed.

7. The system according to claim 1, wherein the reference location is a rear side of the array.

8. A storage device, comprising:
   a system condition monitoring module that determines a status of a system condition;
   a spindle having a rotational operating speed that is indicative of time to access data stored in the storage device; and
   a logic that, based on the status of the system condition compared with a predetermined threshold for the storage device, determines whether to throttle the rotational operating speed;
   wherein a degree of throttling applied to the operating speed is based on distance to the storage device from a reference location for the system condition.

9. The storage device according to claim 8, wherein the system condition comprises ambient temperature and the system condition monitoring module comprises one or more temperature sensors operable to determine temperature in the environment of the storage devices.

10. The storage device according to claim 8, wherein when the system condition does not exceed the predetermined threshold, the logic determines that throttling is not necessary and maintains the rotational operating speed at full speed.

11. The storage device according to claim 8, wherein when the system condition does exceed the predetermined threshold, the logic determines that throttling is necessary and adjusts the rotational operating speed to a lower predetermined rotational operating speed to ensure reliability.

12. A method, comprising:
   providing an array of storage devices coupled to a computing device;
   determining a status of a system condition;
   throttling the operating speed of one or more storage devices in the array based on the status of the system condition;
   determining relative frequency of access to data to be stored by the computing device in the array of storage devices; and
   optimizing storage of data by the computing device in the array of storage devices based at least in part on 1) relative frequency of access to data and 2) which of the one or more storage devices are throttled;
   wherein throttling the operating speed of one or more storage devices in the array further comprises reducing the operating speed of the storage devices in the array in inverse relation to distance from the storage devices to a reference location.

13. The method according to claim 12, wherein optimizing storage of data by the computing device further comprises storing least accessed data in one of the storage devices having a throttled operating speed.

14. The method according to claim 12, wherein optimizing storage of data by the computing device further comprises storing most accessed data in one of the storage devices not having a throttled operating speed.

15. The method according to claim 12, wherein the system condition comprises ambient temperature.

16. The method according to claim 12, further comprising determining whether throttling is necessary based on the status of the system condition, and maintaining one or more storage devices in the array at full speed.

17. The method according to claim 12, wherein the reference location is a rear side of the array.

18. The method according to claim 12, wherein throttling the operating speed of one or more storage devices in the array further comprises reducing the operating speed of ones of the storage devices in the array within a first row while maintaining one or more storage devices in the array within a second row at full speed.

19. The system of claim 1, wherein the array of storage devices comprises a plurality of rows of storage devices, and a same level of throttling is applied to each storage device of a row based on proximity of the row to the reference location.

20. The method of claim 12, further comprising selecting at random at least one of the storage devices for throttling based on the status exceeding a predetermined threshold.

* * * * *